(12) United States Patent
Rappaport et al.

(10) Patent No.: US 10,547,372 B2
(45) Date of Patent: Jan. 28, 2020

(54) SYSTEM, DEVICE, AND METHOD FOR HIGH-FREQUENCY MILLIMETER-WAVE WIRELESS COMMUNICATION USING INTERFACE POINTS

(71) Applicant: New York University, New York, NY (US)

(72) Inventors: Theodore S. Rappaport, Riner, VA (US); Dennis Shasha, New York, NY (US)

(73) Assignee: New York University, New York, NY (US)

( * ) Notice: Subject to any disclaimer, the term of this patent is extended or adjusted under 35 U.S.C. 154(b) by 463 days.

(21) Appl. No.: 14/934,327

(22) Filed: Nov. 6, 2015

(65) Prior Publication Data

US 2016/0134356 A1 May 12, 2016

Related U.S. Application Data

(60) Provisional application No. 62/076,611, filed on Nov. 7, 2014.

(51) Int. Cl.
*H04B 7/15* (2006.01)
*H04W 16/26* (2009.01)

(52) U.S. Cl.
CPC .............. *H04B 7/15* (2013.01); *H04W 16/26* (2013.01)

(58) Field of Classification Search
CPC .............................. H04W 40/00; H04W 92/02
See application file for complete search history.

(56) References Cited

U.S. PATENT DOCUMENTS

RE33,743 E 11/1991 Blaese
5,438,338 A 1/1995 Thill
(Continued)

FOREIGN PATENT DOCUMENTS

WO WO1994029926 A1 12/1994
WO WO1995014354 A1 5/1995
WO WO2014190074 A1 11/2014

OTHER PUBLICATIONS

T. S. Rappaport, et al., Wideband Millimeter-Wave Propagation Measurements and Channel Models for Future Wireless Communication System Design, IEEE Trans. Comm., Sep. 2015.
(Continued)

*Primary Examiner* — Kevin C. Harper
*Assistant Examiner* — Henry Baron
(74) *Attorney, Agent, or Firm* — Hunton Andrews Kurth LLP

(57) ABSTRACT

Exemplary embodiments include a communication system comprising a portal between radio-frequency propagation environments; one or more of interface points disposed in the plurality of propagation environment and configured to communicate with each other via the portal; and one or more access points disposed in one of the propagation environments, at least a portion being configured to communicate with a particular interface point. Other embodiments include apparatus for communicating across radio-frequency propagation environments comprising at least one antenna array, a computer arrangement, and a non-transitory, computer-readable medium comprising computer-executable instructions that configure an adaptive antenna array to receive expected signals from a device or system disposed in a first propagation environment and to reject interfering signals originating in the same environment; and transmit the received expected signals to a compatible apparatus in a
(Continued)

second propagation environment via a portal that is relatively permeable with respect to a particular frequency.

31 Claims, 3 Drawing Sheets

(56) References Cited

U.S. PATENT DOCUMENTS

| | | |
|---|---|---|
| 5,451,966 A | 9/1995 | Mockus |
| 5,471,222 A | 11/1995 | Du |
| 5,589,839 A | 12/1996 | Lindemeier et al. |
| 5,742,255 A | 4/1998 | Afendras |
| 6,172,651 B1 | 1/2001 | Du |
| 6,295,033 B1 | 9/2001 | Chatzipetros et al. |
| 6,421,020 B1 | 7/2002 | Chatzipetros et al. |
| 6,490,443 B1 | 12/2002 | Freeny |
| 6,686,882 B2 | 2/2004 | Petros |
| 7,079,722 B2 | 7/2006 | Mahbobi |
| 8,331,854 B2 * | 12/2012 | Rappaport ............. H04B 1/719 455/11.1 |
| 8,593,358 B2 | 11/2013 | Mierzwa et al. |
| 8,611,812 B2 | 12/2013 | Rappaport |
| 2006/0025072 A1 * | 2/2006 | Pan ....................... H04W 52/242 455/11.1 |
| 2011/0216695 A1 * | 9/2011 | Orth ....................... H04W 40/00 370/328 |
| 2013/0328723 A1 | 12/2013 | Rappaport |

OTHER PUBLICATIONS

H. Zhao, et al., 28 GHz Millimeter Wave Cellular Communication Measurements for Reflection . . . around Buildings in NYC, Proc. IEEE Int'l Conf. on Comm., Jun. 2013.

T. Rappaport, et al., Broadband Millimeter-Wave Propagation Measurements & Models Using Adaptive-Beam . . . Cellular Comm, 61 IEEE Trans Antennas & Propagation 1850-59, Apr. 2013.

S. Nie, et al., 72 GHz Millimeter Wave Indoor Measurements . . . Communications, IEEE 24th Int'l Symposium on Personal, Indoor and Mobile Radio Commun's, 2429-33, Sep. 2013.

T. S. Rappaport, et al., Millimeter Wave Wireless Communications (1st Ed.), Prentice Hall, Sep. 2014 (ISBN-13: 978-0132172288).

Shu Sun, et al, MIMO for millimeter-wave wireless communications: beamforming, spatial multiplexing, or both?, IEEE Comm' Mag. 110-21, Dec. 2014.

Rappaport et al., Millimeter Wave Wireless Communications, pp. 1-698, Pearson c. 2015.

* cited by examiner

SYSTEM, DEVICE, AND METHOD FOR HIGH-FREQUENCY MILLIMETER-WAVE WIRELESS COMMUNICATION USING INTERFACE POINTS

CROSS-REFERENCE TO RELATED APPLICATION(S)

This application is based upon and claims the benefit of priority from U.S. Patent Application Ser. No. 62/076,611, filed on Nov. 7, 2014, the entire disclosure of which is incorporated herein by reference.

FIELD OF THE DISCLOSURE

The present disclosure relates generally to the field of wireless communication systems, and more specifically to a system, method and computer-readable medium for improving the performance of wireless communications through physical barriers (e.g., building materials and/or other obstructions) that conventionally have been relatively impermeable to high-frequency, millimeter-wavelength (mmW) wireless signals.

BACKGROUND INFORMATION

A significant increase in the number of wireless broadband users has led to a severe spectrum shortage in the conventional cellular bands. The demand for cellular and other mobile or portable data services is expected to grow at a high rate, necessitating orders of magnitude increases in wireless capacity. Millimeter wave (mmW) frequencies above 6 GHz—including 28, 38, 60, and 73 GHz—have been attracting growing attention as a possible candidate for next-generation microcellular networks. For example, the Institute of Electrical and Electronics Engineers (IEEE) has promulgated wireless networking standard IEEE 802.11ad, also known as "WiGig", that operates in the 60-GHz spectrum. Millimeter-wave bands offer orders of magnitude greater spectrum and also allow for building high dimensional antenna arrays for further gains via beamforming and spatial multiplexing in both handset devices and infrastructure equipment, as discussed in "Millimeter Wave Wireless Communications," a textbook co-authored by one of the inventors. The FCC in October 2015 proposed rulemaking for the use of 28, 37, 39 and 64-71 GHz bands, the latter band for unlicensed use. Devices utilizing mmW spectrum are available, such as for line of sight backhaul or for home entertainment in Wireless Local area network (WLAN) situations, but they often require careful and/or lengthy set up or are limited in efficacy because of their use of fixed (e.g., non-adaptable), highly directional antennas for backhaul installations, or for their sensitivity to the blockage caused by people or objects for enterprise or home use, or the lack of wireless or wired/fiber infrastructure or high bandwidth infrastructure to allow a vast network of devices, thus often requiring simple short-range, line-of-sight links, within a controlled and static radio frequency propagation environment, such as in a living room or a data center.

As used herein, "radio frequency propagation environment" (or, more simply, "propagation environment" or "environment") may include, for example, conditions, terrain, structures, objects, impairments, obstacles, etc. (collectively "factors") that cause signals of a particular radio frequency, or range of radio frequencies (e.g., signals in one or more bands of mmW frequencies), to behave in a particular manner as they encounter such factors between their transmission point(s) and their reception point(s). Such factors may be more or less fixed ("static") over time; likewise, one or more may be time-variable to individual degrees. Although such factors are not necessarily spatially uniform throughout a particular propagation environment, their range of spatial variation over a particular propagation environment may be less than their ranges of spatial variation over all possible propagation environments. Moreover, as used herein, "multiple" or "a plurality of" environments may include, without limitation: 1) propagation environments whose respective factors are distinct from each other to some degree (e.g., due to lack of proximity); and 2) propagation environments whose respective factors are not necessarily distinct, but that are relatively isolated from each other (e.g., by a barrier that is relatively impermeable to signals of the particular frequency(ies)).

Since a static environment and conditions may be very difficult to achieve in an uncontrolled setting, there is a need to build mmW systems in practical conditions where line-of-sight is not always available. For future mmW wireless networks, it will be important for such systems to operate properly when the signal-to-noise ratios (SNRs) are lower due to mobility and unpredictable obstructed signals, and where devices are interconnected in a cellular-like or networked-like fashion, for many devices to communicate to each other or through hubs, routers, or base stations, such that the communication is beyond just a single lap top and a single monitor, for example.

One of the challenges facing such mmW systems is the much greater degree of scattering of energy and the difficulty of penetrating most building materials at mmW frequencies compared to conventional systems operating at lower UHF/microwave frequencies (see, e.g., T. S. Rappaport, et al., *Wideband Millimeter-Wave Propagation Measurements and Channel Models for Future Wireless Communication System Design*, IEEE Trans. Comm., September 2015). Another way to measure this challenge is the attenuation of the signal on the exit side of the barrier compared to the entry side. Since a higher portion of energy is reflected or scattered, mmW signals originating outdoors will have much greater difficulty penetrating the outer walls of buildings into the interiors of buildings, with any mmW signals that do pass being attenuated to a large degree. Previous studies (see, e.g., H. Zhao, et al., *28 GHz Millimeter Wave Cellular Communication Measurements for Reflection and Penetration Loss in and around Buildings in New York City*, PROC. IEEE INT'L CONF. ON COMMUNICATIONS (ICC), June 2013), have demonstrated that at certain carrier frequencies, certain substances attenuate signals far more than others. For example, at 28 GHz, brick or tinted glass attenuates signals by a factor of 100 to 10,000 (i.e., 20 to 40 dB in power), whereas normal clear glass used inside buildings attenuates signals substantially less, e.g., by 6 dB or less. Similarly, drywall suffers a modest 7-dB penetration loss, brick suffers a 28-dB loss, and other materials suffer losses of 40 dB or more.

Methods and systems to improve coverage and signal level at frequencies above 6 GHz in particularly desired directions through the use directional or adaptive antennas are described in patents owned by co-inventor T. S. Rappaport, such as U.S. Pat. Pub. No. 2013/0328723 and U.S. Pat. No. 8,593,358. Furthermore, wideband repeaters/relays are described in patents owned by co-inventor T. S. Rappaport, such as U.S. Pat. Nos. 8,611,812; 8,331,854; and other related patents. Methods for transferring signals through barriers such as tinted windows are disclosed, for example, in U.S. Pat. Nos. 5,438,338; 5,451,966; 5,471,222;5,589, 839; 5,742,255; 6,172,651; 6,295,033; 6,421,020; 6,490,443; 6,686,882; 7,079,722; and RE33743. Other such methods are described in PCT Pub. Nos. WO1994029926A1 and WO1995014354A1.

Nevertheless, the ability to penetrate particular barriers in controlled ways, such as through specific permeable points in a building or between floors of a building, or at various boundaries that are otherwise difficult to penetrate by mmW frequencies is a novel practical problem for future millimeter wave wireless communication networks, because of the smaller wavelength (and thus greater sensitivities to materials, physical dimensions, antenna configurations, coverage ranges, and so on), as well as the fact that the millimeter wave frontier will require greater densification of cell sites to achieve capacity and coverage while utilizing adaptive arrays and relays. Moreover, the need for increased wireless communications capacity, the inadequate amounts of spectrum available at lower frequencies, and the need for user mobility both inside and outside will necessitate overcoming this increased attenuation, reflectivity, and/or scattering in novel ways in order to communicate across the indoor-outdoor barrier at mmW frequencies. Thus, it can be beneficial to address at least some of the issues and problems identified herein above.

SUMMARY OF EXEMPLARY EMBODIMENTS

Accordingly, it is possible to provide exemplary embodiments of methods, systems, devices, and computer-readable media of the present disclosure that address at least some of such issues and/or problems, and that out-perform conventional methods, techniques and systems in various known applications, including exemplary applications discussed herein.

For example, in certain exemplary embodiments of the present disclosure, it is possible to provide a communication system comprising a portal between a plurality of radio-frequency propagation environments that are otherwise relatively isolated (due to the aforementioned attenuation) with respect to a particular range of radio frequencies. In some exemplary embodiments, the portal can comprises a material that is relatively permeable to a predetermined range of radio frequencies (e.g., one or more bands of mmW frequencies) compared to one or more other materials in proximity to the portal. Such an exemplary system can also include a plurality of interface points disposed in the plurality of propagation environments and configured to communicate with each other via the portal. In addition, one or more access points can be disposed in one of the propagation environments, whereas at least a portion of the access points can be configured to transfer, conduct, or otherwise relay transmissions to destinations outside of the particular propagation environment via communication with an interface point and to relay transmissions to destinations within the particular propagation environment without communication with an interface point. Other exemplary embodiments include methods and computer-readable media embodying one or more of the exemplary aspects of such exemplary system.

According to further exemplary embodiments of the present disclosure, it is also possible to provide an apparatus for communicating across a plurality of radio-frequency propagation environments comprising at least one antenna array, a computer arrangement, and a non-transitory, computer-readable medium comprising computer-executable instructions which can be executed by the computer arrangement to cause the apparatus to perform certain exemplary procedures. For example, an adaptive antenna array can be configured to receive expected signals from one or more apparatus disposed in a first propagation environment and to reject interfering signals originating in the first propagation environment. Such an exemplary antenna array can be further configured to transmit the received expected signals using a first radio frequency to a compatible apparatus in a second propagation environment via a portal that is relatively permeable with respect to at least the first radio frequency. Other exemplary embodiments include methods and computer-readable media embodying one or more of the exemplary aspects of the apparatus.

These and other objects, features and advantages of the exemplary embodiments of the present disclosure will become apparent upon reading the following detailed description of the exemplary embodiments of the present disclosure, when taken in conjunction with the appended paragraphs.

BRIEF DESCRIPTION OF THE DRAWINGS

Further objects, features and advantages of the present disclosure will become apparent from the following detailed description taken in conjunction with the accompanying Figures showing illustrative embodiments, in which.

Figure 1:
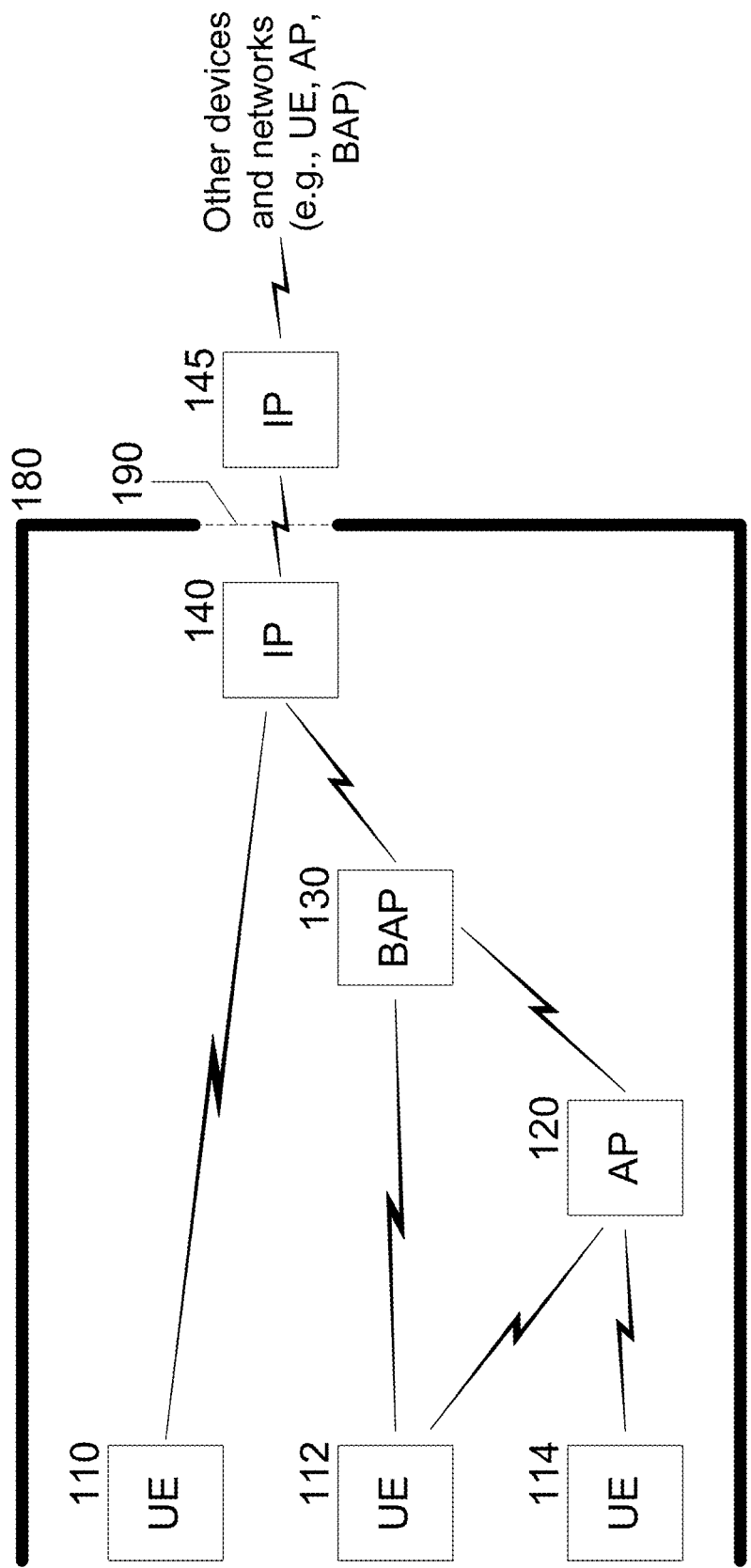
FIG. 1 is a block diagram of an exemplary communication system according to one or more exemplary embodiments of the present disclosure.

While the present disclosure will now be described in detail with reference to the figures, it is done so in connection with the illustrative embodiments and is not limited by the particular embodiments illustrated in the figure(s) or in the appended paragraphs.

DETAILED DESCRIPTION OF EXEMPLARY EMBODIMENTS

As discussed herein above, buildings are normally built with materials that naturally isolate electromagnetic signals on each side of the indoor-outdoor barrier, thereby attenuating mmW signals originating on one side such that they do not interfere with signals originating on the other, but also preventing mmW signals originating on one side from reaching the intended recipient on the other side due to excess attenuation. For example, according to the study results described above, tinted glass would provide approximately 20 to 40 dB of inside/outside shielding or protection for signals originating on one side of the barrier (e.g., inside) against interfering signals originating from sources on the opposite side (e.g., outside), such as wireless devices or networks.

Furthermore, with respect to mmW signals that remain on the same side of the indoor-outdoor barrier from which they originate, the presence of reflective materials may provide certain performance benefits by allowing receivers to capture multiple reflections of the signals using time- and/or spatial-diversity techniques, including Multiple Input Multiple Output (MIMO) antenna arrays and beamforming. The use of such advance receiver technologies at mmW frequencies has been discussed, for example, in T. Rappaport, et al.,

*Broadband Millimeter-Wave Propagation Measurements and Models Using Adaptive-Beam Antennas for Outdoor Urban Cellular Communications,* 61 IEEE TRANS. ANTENNAS & PROPAGATION 1850-59 (April 2013), and S. Nie, et al., *72 GHz Millimeter Wave Indoor Measurements for Wireless and Backhaul Communications,* IEEE 24TH INT'L SYMPOSIUM ON PERSONAL, INDOOR AND MOBILE RADIO COMMUN'S 1 (PIMRC) 2429-33, (September 2013) and T. Rappaport, et al, *Millimeter Wave Wireless Communications,* Pearson c. 2015.

According to certain exemplary embodiments of the present disclosure, it is possible to provide and/or utilize interface points that providing energy from a first location or environment (e.g., inside a building) to be routed and/or redirected in one or more strategically important directions such that the energy can reach a second location or environment that otherwise is relatively isolated from the first environment. In some exemplary embodiments, one of the first and second environments can be inside a building or structure and the other is outside the building or structure. In some exemplary embodiments, both of the first and second environments are inside the same building or structure. For example, depending on the embodiment, interface points can provide users inside of a building the ability to transmit and/or receive signals to/from an outdoor network that is otherwise relatively inaccessible, or to transmit and/or receive signals to/from other locations with the building that is otherwise relatively inaccessible (e.g., where metal walls or elevator shaft greatly attenuate mmW signals).

Accordingly, the systems, method and device according to exemplary embodiments of the present disclosure can facilitate the transmission of signal between boundaries and can be used for improving communication between, for example, floors of a building, walls within a building, between vehicles, within a vehicle (e.g., from the under-chassis to the passenger area), and in other scenarios where mmW signals can have difficulty penetrating. Furthermore, the systems, method and device according to exemplary embodiments of the present disclosure can be used for short-range communication (e.g., in Internet of Things environment, in which devices, clothing, electronics, sensors, appliances, etc. communicate in close distances, e.g., within 10 m) as well as for mid- and long-range, such as Wi-Fi or cellular networks, where transmissions may be between individuals or devices and installed infrastructure.

According to some exemplary embodiments of the present disclosure, the interface point can facilitate routing a received, expected signal (e.g., mmW wireless signal) through a permeable portion (a "portal") of a building or structure that is primarily impermeable to such a signal. In some exemplary embodiments, the interface point can route such a signal to a corresponding interface point on the other side of the portal that is capable of receiving such a signal. The two interface points can facilitate bi-directional wireless communication with each other via the portal. Depending on the exemplary embodiments, interface points may be owned, operated, and/or controlled by a wide range of parties including building owners or tenants, government entities (e.g., municipalities), wireless service providers, antenna site providers, or other parties involved in the use and/or provision of wireless communication.

According to further exemplary embodiments of the present disclosure, the interface point can comprise a passive structure configured to enhance or aid the reflection or scattering of radio signals for transmission and/or routing through the portal in a structure. In some exemplary embodiments, the interface point can comprise a reflective mirror configured as a wide variety of shapes (e.g., flat surface, plate, radome, grating, etc.) and textures (e.g., rough or smooth) based on the reflective requirements of the particular application. The exemplary reflective mirror can comprise a conductor comprising one or more of a wide variety of materials, such as copper, aluminum, lightweight plastic coated with a metal film, etc. In addition or alternatively, the reflective mirror can comprise one or more materials other than a conductor, such as a semiconductor, composite, or dielectric material. In various exemplary embodiments, the size of the particular interface point can depend on factors such as the expected signal strength of signals to be transferred at the interface point, the materials used to construct the interface point, the frequency band(s) used in the device, as well as physical constraints pertaining to the interface point and/or its location.

In addition or alternatively, the interface point can comprise an active structure comprising one or more components known to persons of ordinary skill such as, e.g., amplifiers, filters, receivers, transmitters, oscillators, sensors, antennas, processors, memories, etc. In addition or alternatively, the interface point can comprise a plurality of antennas (e.g., an antenna array) configured to transmit and/or receive in a spatially selective manner, e.g., in order to receive expected signals and to reject interfering signals. For example, various parameters and/or capabilities of the interface point can be adaptable, adjustable, and/or tunable, either under control of the interface point itself, under control of an external source (e.g., network control), or by a combination thereof. Such exemplary adaptable capabilities can comprise frequency bands and/or channels, spatial selectivity and/or directionality, signal characteristics, expected and/or interfering signals, transmit power levels, etc.

According to other exemplary embodiments of the present disclosure, the interface point can communicate with end-user wireless devices (referred to herein as "user equipment") directly and/or via one or more intermediate access points. In some exemplary embodiments, the interface point can communicate with user equipment and other access points via a border access point dedicated for that purpose. In addition or alternatively, the interface point can be co-located with and/or comprise the functionality of a border access point. In addition or alternatively, the interface point can be co-located with or disposed in proximity to the portal in the structure (e.g., a low-loss building interface) through which it is intended to transmit and/or receive expected signals.

According to additional exemplary embodiments of the present disclosure, the interface point can be co-located with the point of high permeability, e.g., collocated with a repeater or base station or a low loss building interface. For example, wireless devices (e.g., cellular phones) operating in the outside environment can be equipped with directional beamforming antennas that could alter their steering directions. Such directional beamforming antennas can utilize a wide range of antenna approaches known in the literature, such as those described in, e.g., Shu Sun, et al, *MIMO for millimeter-wave wireless communications: beamforming, spatial multiplexing, or both?,* IEEE COMM'NS MAG. 110-21, December 2014. Through the exemplary process of successive or parallel beam steering, the wireless devices can attempt to receive a reflected or scattered signal from the interface points, in order to identify their locations, and the relative pointing angles from the outdoor device. Those relative pointing angles can then be used to transmit and receive further signals.

Other exemplary embodiments include a communication system comprising a portal between a plurality of radio-frequency propagation environments; one or more interface points disposed in the plurality of propagation environments, wherein each of the interface points is configured to communicate with one or more other interface points via the portal; and one or more access points disposed in a particular one of the propagation environments, wherein at least a portion of the one or more access points are configured to relay one or more transmissions to one or more destinations outside of the particular propagation environment via communication with an interface point disposed in the particular propagation environment.

Additional exemplary embodiments include a method for configuring a communication system for operating in a propagation environment, comprising (a) selecting initial locations for a plurality of components of the communication system and values for one or more operating parameters for a communication between the components; (b) determining propagation models for each of expected signals and interfering signals received by a particular one of the components; (c) for at least one of the components, determine adaptive antenna settings that result in a substantially optimum value of a metric with respect to the expected and interfering signals based on the determined propagation models; and (d) if the substantially optimum value of the metric is sufficient, select different values for at least one of the one or more of operating parameters or a further location of at least one of the components, and repeat operations (a) through (c).

FIG. 1 shows a block diagram of an exemplary communication system according to an exemplary embodiment of the present disclosure that utilizes one or more exemplary embodiments of interface points (IPs). For example, as illustrated in FIG. 1, three end-user devices—user equipment (UE) 110, 112, and 114—can be located within a structure 180 (e.g., a commercial building) that can be relatively impermeable to wireless signals (e.g., mmW signals) originating outside of structure 180 (e.g., in outdoor public cellular network) that UEs 110, 112, and/or 114 attempt to receive. Likewise, an exemplary structure 180 can be impermeable to mmW signals that the UEs attempt to transmit to recipients outside of structure 180. As discussed herein, such impermeability can be due to, for example, the types of materials used to construct exemplary structure 180. As discussed herein, user equipment (UE) can include, but is not limited to, human-centric communication devices (e.g., smartphones, tablets), computing devices (e.g., laptops), computer peripherals (e.g., printers), display devices, smart sensors and/or controllers (e.g., thermostats), fixed and portable appliances (e.g., refrigerators, vacuum cleaners), entertainment-centric devices (e.g., televisions), smart clothing, or other devices operable in an "Internet of Things" environment.

As illustrated in FIG. 1, structure 180 can comprise a portal 190 that can be relatively more permeable to expected wireless signals (e.g., signals having a particular frequency, such as mmW signals) than other portions of structure 180. For example, portal 190 can comprise a permeable material such as regular (e.g., non-tinted) glass, and other portions of structure 180 can comprise less permeable materials, such as, e.g., brick and tinted glass. Two interface points (IPs) 140 and 145 can be disposed in two different environments on either side of a portal 190, and communicate wirelessly through portal 190 using signals of a particular frequency that passes through portal 190 with relatively little attenuation, scattering, and/or reflection.

Persons of ordinary skill in the art will readily comprehend that permeability can be measured in various ways such as, e.g., reflectivity, reflection coefficient, penetration loss, attenuation, etc. Persons of ordinary skill will further comprehend that permeability can vary depending on factors and/or conditions including, e.g., location and/or thickness of the material, frequency of the mmW signal, incidence angle of the mmW signal to the material, etc. Exemplary permeability measured for various building materials under various conditions are given in Tables 3.2-3.3 (for 28 GHz) and Table 3.4 (for 73 GHz) of T. S. Rappaport, et al., MILLIMETER WAVE WIRELESS COMMUNICATIONS ($1^{ST}$ ED.), Prentice Hall, September 2014 (ISBN-13: 978-0132172288), incorporated herein by reference.

Each of IPs 140 and 145 can facilitate UEs and other devices within their respective environments to communicate with UEs and other devices in the other environment. For example, in some exemplary embodiments, IP 140 can communicate directly with one or more UEs located in the same environment, such as UE 110. In other exemplary embodiments, IP 140 can communicate indirectly with one or more UEs located in the same environment, such as UEs 112 and 114, via one or more access points (APs). In additional exemplary embodiments, the one or more APs can include a border access point (BAP) such as BAP 130, which can provide a dedicated network interface or intermediate node for UEs and other APs in the particular environment to communicate with the external interface point for that environment, such as IP 140 in FIG. 1. For example, any communication between UEs 112 and 114 can occur via AP 120, e.g., while any communications to recipients outside of structure 180 can occur via BAP 130 and IP 140.

In some exemplary embodiments of the present disclosure, at least a portion of the various devices shown in FIG. 1 utilize adaptive antenna arrays that can be configured to be spatially selective. As used herein, "spatial selectivity" can refer to the ability to form one or more beams of an antenna array to receive signals incident from one or more particular ranges of azimuths and/or elevations, and/or to adequately attenuate and/or reject signals incident from other ranges of azimuths and/or elevations. For example, IP 140 can comprise an adaptive antenna array that can be configured to provide one or more "steerable beams" that are spatially selective in the directions of the devices to which IP 140 is communicating, such as BAP 130 and UE 110. Each of these exemplary devices can also utilize an adaptive antenna array to communicate with IP 140. By use of spatially selective antennas in this manner, IP 140 can capture the energy of the expected signals that are intended for transmission through portal 190 while rejecting the energy of arbitrary, interfering signals from other sources, e.g., signals intended for devices within structure 180. Furthermore, even if an interfering signal is directed toward IP 140, the spatial selectivity of IP 140's antenna array can cause the received interfering signal (e.g., from UE 110) to be substantially weaker than expected signals received by IP 140 (e.g., signals from BAP 130).

Various exemplary antenna arrays can be utilized in the IPs, APs, BAPs and UEs shown in FIG. 1. An exemplary antenna array can comprise a plurality of individual antenna elements arranged in a particular pattern, such as, e.g., nine elements arranged in 3-by-3 grid. In some exemplary embodiments, the antenna array can be arranged as an M-by-N array of elements, where M≥1 and N>1. According to other exemplary embodiments, the antenna elements can be arranged in a rectangular grid with equal spacing in one or both dimensions. In addition or alternatively, each antenna array element can have various physical forms including dipole, patch, cross dipole, inverted F, inverted L, helix, Yagi, rhombic, and/or any another type of antenna topology known to persons of ordinary skill. Moreover, each antenna array element can utilize various polarization patterns known to persons of ordinary skill, including horizontal, vertical, circular, and cross polarization. In some exemplary embodiments, the type of antenna element and/or their arrangement in the array can be designed especially for the particular operating frequency (e.g., about 20 GHz) and the particular device in which the array is used, e.g., IPs 140 and 145, BAP 130, AP 120 or UEs 110, 112, and 114 illustrated in FIG. 1.

Various methods known to persons of ordinary skill can be used to adapt and/or configure the spatial selectivity of antenna arrays used in one or more of the devices shown in FIG. 1. For example, in situations where the transmitting and receiving devices are fixed (e.g., BAP 130 and IP 140), the spatial selectivity and directivity of each antenna array can be configured once at initialization based on the known locations. In other situations where one or more of the locations is not fixed (e.g., UE 110), a receiving device can configure the spatial selectivity of its antenna array by successive attempts or iterations of receiving a known signal (e.g., a pilot signal) from a transmitting device (e.g., IP 140), estimating the relative azimuth and/or elevation angle of one or more multipath components of the signal, and adjusting the gains and phases corresponding to the elements of the antenna array to affect the spatial selectivity. One exemplary method and device incorporating these capabilities is described in PCT patent application Ser. No. PCT/US14/39007, incorporated by reference in its entirety into the present application.

Similarly, for exemplary embodiments utilizing passive interface points, the degree and/or pattern of reflectivity or scattering can be selected to minimize or reduce the accidental propagation of interfering signals, e.g., by selection of a lossy material and/or by a change in surface texture or roughness.

In other exemplary embodiments, interface points can be configured to transmit a signal including data or information that can be used to identify or describe one or more characteristics about the interface point (e.g., power level, coverage, etc.), its location (e.g., elevation above ground, latitude/longitude, surroundings, etc.), the building or structure (e.g., materials, attenuation loss, size, etc.), the owner/operator/service provider, etc. In addition or alternatively, the interface point can be configured by an operator to transmit at least a portion of the information. In addition or alternatively, the interface point can determine at least a portion of the transmitted information based on communications received from devices in the environment it serves (e.g., indoor) or from devices in the environment served by its peer interface point across the permeable section.

Devices receiving such a signal transmitted by the interface point can use it in various exemplary ways, including to determine or improve an estimate of their position or location, to determine whether or to what degree communication via the interface point is feasible, etc. For example, the data embedded in the interface point signal can be used for various end-user location-based services, such as mapping, navigation, local search for services, public safety or emergency (e.g., 911), etc. Additionally or alternatively, such information can be used for network-based applications such as user registration and capacity monitoring.

In some exemplary embodiments, the various devices in a particular environment can operate cooperatively to minimize undesirable transmissions within that environment. For example, BAP 130 can be configured to establish a spatially selective communication link with IP 140 only if it has received a signal that is intended to be transmitted through IP 140. For example, BAP 130 can refrain from establishing a spatially selective communication link with UE 140 unless it has established a spatially selective communication link with UE 112 or AP 120. Similarly, IP 140 can refrain from establishing a communication link with IP 145 through portal 190 until it has received information to be relayed outside the environment via, for example, spatially selective communication links with UE 110 or BAP 13.

Such systems, method and device according to exemplary embodiments of the present disclosure can be applicable to an Internet of Things (IoT) environment in which signals from certain devices that are intended to be tethered, limited, and/or restricted to a particular environment should be confined to that particular environment for protection of privacy and/or security. Such particular environments can include a fixed-and-bounded location (e.g., home or office), a movable-but-bounded location (e.g., vehicle), and/or upon or in close proximity to an individual (e.g., clothing, personal communication device). The decision of whether to establish or refrain from establishing a connection via, e.g., a spatially selective communication link, can be based on information relating to a device (e.g., UE 140), a device user, a device location, an BAP/IP location, etc. Such information can be included in a signal received by the decision-making entity (e.g., BAP 130 and/or IP 140) from the device desiring to establish the connection.

Accordingly, the expected density and distribution of the devices communicating with the interface point (e.g., UEs and BAPs) can be used together with the reflective, scattering, attenuation, and/or transmission properties of the interface point itself, to determine the placement of the interface point(s) in an environment. For example, it can be desirable to place an interface point such that undesirable signals from UEs (e.g., signals intended to remain within a building and/or within a vehicle) are unlikely to reach it without substantial attenuation. For example, in a courtyard, it may be desirable to place interface points away from places where electromagnetic waves would be funneled due to reflections. Similarly, interface points can be placed in the recesses of hallways. In an entertainment venue where some space is heavily occupied (e.g., amphitheater) but other space is less occupied (e.g., bathrooms), interface points can be placed away from the stage. Following such exemplary guidelines can ensure and/or facilitate that all expected signals (i.e., those intended to exit the environment) will read the interface points via BAPs or the like.

Furthermore, an exemplary propagation model of the operating environment of the system employing the interface points (e.g., the environment within structure 180 shown in FIG. 1) can be used to determine optimal placement of the interface points and BAPs. For example, BAPs can be placed such that the signals they transmit to the IP will be received by the IP at sufficiently different angles than interfering signals (e.g., co-channel interferers) from other devices such as UEs and non-border APs. The exemplary characteristics of the devices within the environment also can determine or affect the placement. For example, using antenna arrays that are steerable and highly spatially selective for the particular communication with the IP (e.g., from the BAP or UEs, as the case may be) can reduce the restrictions on the placement of the BAP and IP. Moreover, the ability to adjust the carrier frequency(ies) used for communication with the IP can also help avoid interfering signals including those that cannot be rejected by using a spatially selective antenna array in the IP.

Figure 2:
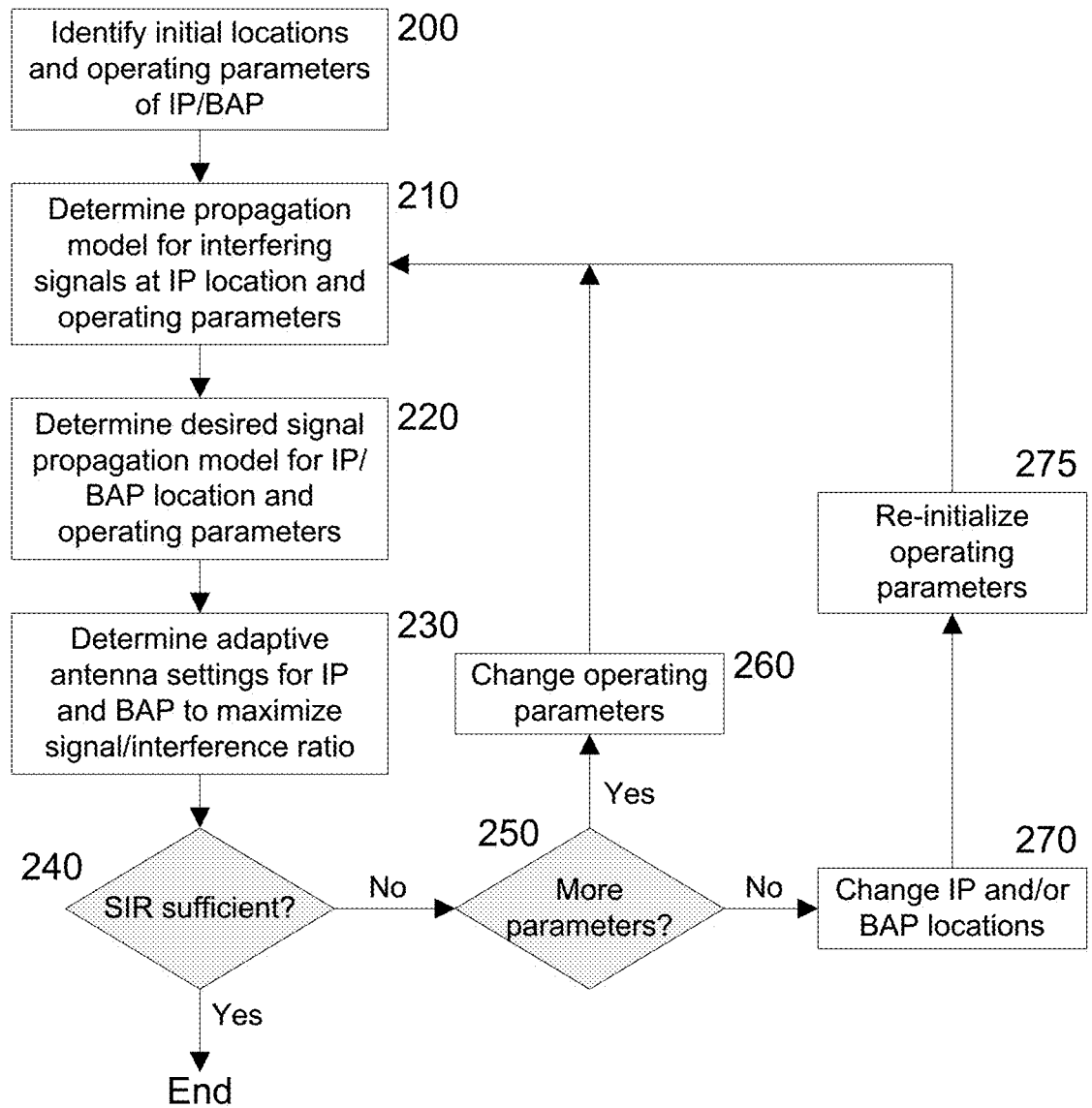
FIG. 2 is an exemplary flow diagram of an exemplary method for configuring the locations and/or operating frequencies of an interface point (IP) and a corresponding border access point (BAP)

FIG. 2 shows an exemplary flow diagram of an exemplary method for configuring the locations and/or operating frequencies of an interface point (IP) and a corresponding border access point (BAP) according to an exemplary embodiment of the present disclosure. Although the exemplary method is illustrated in FIG. 2 by blocks in the particular order shown in FIG. 2, this order is merely exemplary and the functions corresponding to the blocks may be performed in different orders and may be combined and/or divided into blocks having different functionality than shown in FIG. 2.

Turning to FIG. 2, at the beginning, the exemplary method proceeds to block 200 where initial locations and initial values for one or more operating parameters for communicating between the IP and the BAP can be identified or selected. In some exemplary embodiments, the operating parameters may comprise one or more of radio frequency, antenna polarization, modulation scheme, processing gain, signal bandwidth, forward error correction (FEC) scheme, and retransmission scheme. Initial values may be selected for one or more of these parameters; in case values are not selected for certain operating parameters, default values may be used. In block 210, an exemplary propagation model for interfering signals at the selected IP location and operating parameters (e.g., radio frequencies) can be determined. As discussed herein, such an exemplary model can be determined based on knowledge and/or assumptions about the density and distribution of UEs and/or (non-border) APs within the environment served by the IP. Methods for determining such a propagation model given these inputs are known to persons of ordinary skill.

In block 220, given the selected operating parameters and locations, a propagation model for the particular communication signal between the IP and BAP can be determined. In block 230, adaptive antenna settings for one or more of the IP and BAP can be determined to maximize the signal-to-interference ratio (SIR) between the expected signal (e.g., BAP to IP) and the interfering signals (e.g., from APs and/or UEs) observed at the IP's receiver. The adaptive antenna settings can be determined, for example, based on the propagation models for the expected and interfering signals determined in blocks 220 and 210, respectively. The SIR for such determined adaptive antenna settings can also be determined in block 230. Although SIR is shown in blocks 230 and 240 and discussed herein below, other commonly known performance metrics, such as signal-to-noise ratio (SNR), signal-to-interference-plus-noise ratio (SINR), carrier-to-interference ratio (C/I), energy-per-bit-to-noise-density ratio ($E_b/N_0$), bit error rate, packet error rate, frame erasure rate, etc. could be used in place of SIR to determine suitable or desired performance levels. A plurality of these or other commonly known performance metrics can also be used, either individually or in combination. Furthermore, although the operation in block 230 is shown and described as maximizing the SIR, persons of ordinary skill will recognize that, based on the choice of particular metric(s), the operation in block 230 may comprise minimizing or otherwise determining a value of the chosen metric(s) that is(are) substantially optimum in some particular manner.

Further, in block 240, the determined SIR can be checked to determine if it is sufficient for reliable communication between the IP and BAP. This can be done in many ways including, for example, by comparing the determined SIR to a threshold. In other exemplary embodiments, the sufficiency determination in block 230 can be based on one or more estimated statistics of the SIRs, such as mean, median, standard deviation, variance, a particular percentile (e.g., 95%), etc. If the checking in block 240 shows the SIR to be sufficient, then the process can end and normal operation can begin. If the SIR is insufficient, in block 240, it can be determined in block 250 whether there are other potential values of the operating parameters for the communication between IP and BAP that remain to be evaluated. If so, new values for one or more of the operating parameters can be selected in block 260, after which execution can proceed to block 210 through block 240 for the newly selected operating parameter values but same locations.

On the other hand, if the test in block 250 indicates that no other values of operating parameters remain to be tested for suitability at the selected IP and/or BAP locations, then execution proceeds to block 270 where one or more of the IP and BAP locations can be changed. Subsequently, at block 275, values for the operating parameters can be changed, for example, to the values of the operating parameters selected in block 200. Execution can then proceed to block 210 through block 240 for the newly selected one or more locations and operating parameter values.

Figure 3:
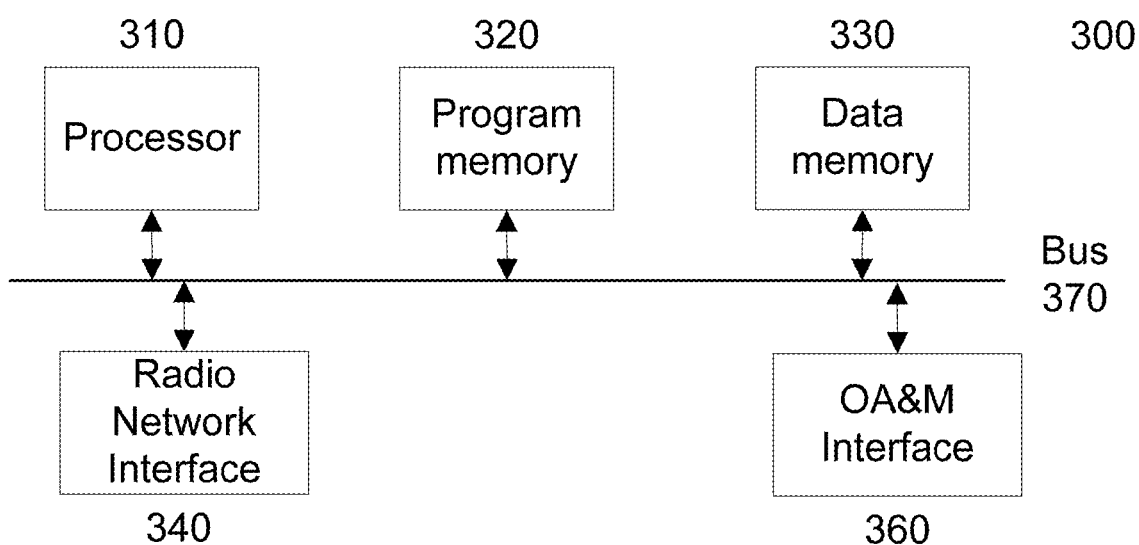
FIG. 3 is a block diagram of an exemplary device and/or apparatus, according to one or more embodiments of the present disclosure.

FIG. 3 shows a block diagram of an exemplary apparatus 300 utilizing certain exemplary embodiments of the present disclosure, including those described above with reference to FIGS. 1 and 2. For example, apparatus 300 can comprise an interface point (IP) and/or a border access point (BAP). Apparatus 300 can also comprise a processor 310 that can be operably connected to program memory 320 and data memory 330 via a bus 370 that can comprise parallel address and data buses, serial ports, and/or other methods and/or structures known to those of ordinary skill in the art. Program memory 320 can comprise software code executed by processor 310 that enables, causes, facilitates and/or programs exemplary apparatus 300 to communicate with one or more other devices, equipment, or apparatus using one or more wired or wireless communication protocols, including one or more wireless communication protocols standardized by 3GPP, 3GPP2, or IEEE, such as those commonly known as LTE, UMTS, HSPA, GSM, GPRS, EDGE, 1xRTT, CDMA2000, 802.11 WiFi standards, HDMI, USB, Firewire, etc., or any other protocols known now or in the future that can be utilized in conjunction with radio transceiver 340 and/or host interface 360.

Program memory 320 can also comprise software code executed by processor 310 that can facilitate apparatus 300 to communicate with one or more other devices using other protocols or protocol layers, such as one or more of the PHY, MAC, RLC, PDCP, and RRC layer protocols standardized by 3GPP, IEEE, or any other standards-setting organization, or any other higher-layer protocols utilized in conjunction with radio network interface 340 and/or OA&M interface 360. Program memory 320 can also comprises software code executed by processor 310 to control the functions of apparatus 300, including configuring and controlling various components such as radio transceiver 340 and/or OA&M interface 360. Such software code may be specified or written using any known or future developed programming language, such as e.g. Java, C++, C, Objective C, HTML, XHTML, and Assembler, as long as the desired functionality, e.g., as defined by the implemented method steps, is preserved. In addition or alternately, program memory 320 can comprise an external storage arrangement (not shown) remote from apparatus 300, from which the instructions can be downloaded into program memory 320 located within or removably coupled to apparatus 300, so as to enable execution of such instructions.

Data memory 330 can comprise memory area for processor 310 to store variables used in protocols, configuration, control, and other functions of apparatus 300. As such, program memory 320 and data memory may comprise non-volatile memory (e.g., flash memory, hard disk, etc.), volatile memory (e.g., static or dynamic RAM), network-based (e.g., "cloud") storage, or a combination thereof. Furthermore, data memory 330 can comprise a memory slot by which removable memory cards in one or more formats (e.g., SD Card, Memory Stick, Compact Flash, etc.) may be inserted and removed. Persons of ordinary skill in the art will recognize that processor 310 can comprise multiple individual processors (e.g., multi-core processors), each of which implements a portion of the functionality described above. In such exemplary case, multiple individual processors may be commonly connected to program memory 320 and data memory 330 or individually connected to multiple individual program memories and or data memories. More generally, persons of ordinary skill in the art can recognize that various protocols and other functions of apparatus 300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Exemplary radio transceiver 340 can comprise radio-frequency transmitter and/or receiver functionality that facilitates the apparatus 300 to communicate with other equipment supporting like wireless communication standards and/or protocols such as, in some embodiments, one or more other compatible interface points (IPs), one or more compatible user equipment (UEs), and/or one or more access points (APs), as illustrated in FIG. 1 and discussed herein. In some exemplary embodiments, radio transceiver 340 can comprise some or all of the functionality of the interface point (IP), the access points (APs), and/or the border access point (BAP) shown and described herein with reference to FIG. 1.

In some exemplary embodiments, radio transceiver 340 can include a transmitter and a receiver that can facilitate apparatus 300 to communicate with various Fifth-Generation (5G) (or other) networks according to various protocols and/or methods proposed for standardization by 3GPP and/or other standards bodies. According to further exemplary embodiments, radio transceiver 340 can be configured to facilitate a communication using, e.g., millimeter-wave (mmW) radio technologies that operate in frequency bands near or above 20 GHz. For example, the radio transceiver 340 can include circuitry (e.g., transmitter and receiver), firmware, etc. that can facilitate the apparatus 300 to communicate with various compatible WiGig and/or 802.11ad radio networks according to standards promulgated by IEEE. In addition or alternatively, the radio transceiver 340 can include circuitry (e.g., transmitter and receiver), firmware, etc. an Long Term Evolution (LTE)-compatible transmitter and receiver that can facilitate the apparatus 300 to communicate with various compatible Long-Term Evolution (LTE) networks (also known as "4G" or "4G LTE") according to standards promulgated by 3GPP. In some exemplary embodiments of the present disclosure, the radio transceiver 340 can include circuitry, firmware, etc. necessary for the apparatus 300 to communicate with various UMTS and/or GSM/EDGE networks, also according to 3GPP standards. In addition or alternatively, radio transceiver 340 can include circuitry, firmware, etc. utilized by the apparatus 300 to communicate with various CDMA2000 networks, according to 3GPP2 standards. In addition or alternatively, the radio transceiver 340 can be configured to facilitate a communication using radio technologies that operate in unlicensed frequency bands, such as IEEE 802.11 WiFi that operates using frequencies in the regions of 2.4 and/or 5.6 GHz, or Bluetooth. The functionality particular to each of these embodiments may be coupled with or controlled by other circuitry in the apparatus 300, such as the processor 310 executing protocol program code stored in the program memory 320.

In additional exemplary embodiments, radio transceiver 340 can comprise one group or set of circuitry that is used to communicate with IPs (e.g., between IPs 140 and 145 via permeable portal 190 as shown in FIG. 1) and another group of circuitry that is used to communicate with APs, BAPs, and/or UEs, as the case may be. By way of an example, and without limitation, radio transceiver 340 can comprise a transmitter and a receiver configured to transmit and receive on one or more frequencies compatible with an IP, and another transmitter and receiver configured to transmit and receive on another one or more frequencies compatible with APs, BAPs, and/or UEs. By way of a further example, and without limitation, radio transceiver 340 can comprise circuitry compatible with one standard for communicating with an IP, and circuitry compatible with at least one different standard for communicating with APs, BAPs, and/or UEs. In other exemplary embodiments, radio transceiver 340 can comprise circuitry that can facilitate a communication with IPs, APs, BAPs, and UEs, such as, for example, by methods including one or more of time-, frequency-, code-, and spatial-division multiplexing.

OA&M interface 360 can comprise transmitters, receivers, and/or other circuitry that facilitates apparatus 300 to communicate with external networks, computers, databases, and the like for purposes of operations, administration, and maintenance of apparatus 300 or other network equipment operably connected thereto. Lower layers of OA&M interface 360 can comprise one or more of asynchronous transfer mode (ATM), IEEE 802.3 Ethernet, Internet Protocol (IP)-over-Ethernet, SDH over optical fiber, T1/E1/PDH over a copper wire, RS-232, RS-485, USB, HDMI, Bluetooth, IEEE 1394 ("Firewire"), I²C, PCMCIA, microwave radio, or other wired or wireless transmission technologies known to those of ordinary skill in the art. In some exemplary embodiments, OA&M interface 360 can comprise analog interface circuitry including, for example, one or more digital-to-analog (D/A) and/or analog-to-digital (A/D) converters. In some exemplary embodiments, radio network interface 340 and OA&M interface 360, or one or more portions of such interfaces, can be multiplexed together on a single physical interface, such as the exemplary physical interfaces listed above.

Persons of ordinary skill in the art can recognize the above list of features, interfaces, and radio-frequency communication standards is merely exemplary, and not limiting to the scope of the present disclosure. For example, radio transceiver 340 can include circuitry necessary to communicate using additional radio-frequency communication standards including Bluetooth, GPS, and/or others. Moreover, processor 310 can execute software code stored in the program memory 320 to control such additional functionality.

Although not shown in FIG. 3, persons having ordinary skill would understand that, to the extent that apparatus 300 comprises active components (e.g., processor 310, radio transceiver 340), exemplary embodiments of apparatus 300 can further comprises, e.g., a power or energy source, as well as one or more other components. Various sources can be used in conjunction with apparatus 300, including i) an AC/DC converter coupled with an available AC line voltage (e.g., 120V/60 Hz); ii) a battery, such as Lithium ion or Lithium Polymer, which can be rechargeable; iii) a conventional solar cell with associated electronics; iv) a generator coupled with voltage conversion circuitry; v) an energy-harvesting circuit configured to capture energy from one or more mmW signals and/or received signals in other frequency bands; vi) a combination of more than one of the above; or vii) any other power or energy source known in the art to be appropriate according to the configuration and/or location of apparatus 300.

Although various embodiments are described herein above in terms of methods, apparatus, devices, computer-readable medium and receivers, the person of ordinary skill will readily comprehend that such methods may be embodied by various combinations of hardware and software in various systems, communication devices, computing devices, control devices, apparatuses, non-transitory computer-readable media, etc.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus may be implemented by any combination of hardware and software. A device or apparatus may be regarded as a device or apparatus, or as an assembly of multiple devices and/or apparatuses, whether functionally in cooperation with or independently of each other. Moreover, devices and apparatuses may be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A communication system comprising:
   a portal provided between a first radio-frequency (RF) propagation environment and a second RF propagation environment, wherein the first RF propagation environment is different from the second RF propagation environment;
   a first reflective interface point located in the first RF propagation environment, and configured to communicate, through the portal, with a second interface point located in the second RF propagation environment by reflecting a wireless communication signal through the portal; and
   one or more access points disposed in the first RF propagation environment, wherein at least one portion of the one or more access points is configured to transfer one or more transmissions to the second RF propagation environment via communication with the first reflective interface point.

2. The communication system of claim 1, wherein the at least one portion of the one or more access points is further configured to transfer one or more transmissions to destinations within the first RF propagation environment without communicating with the first reflective interface point.

3. The communication system of claim 1, wherein the portal comprises a material that is relatively permeable to a predetermined range of radio frequencies compared to one or more other materials in proximity to the portal.

4. The communication system of claim 1, wherein one of the first RF propagation environment or the second RF propagation environment comprises an indoor environment, and another one of the first RF propagation environment or the second RF propagation environment comprises an outdoor environment.

5. The communication system of claim 1, wherein the first RF propagation environment comprises a first indoor environment, and the second RF propagation environment comprises a second indoor environment, and wherein the first indoor environment is different from the second indoor environment.

6. The communication system of claim 3, wherein the predetermined range of frequencies comprises one or more bands of millimeter-wave (mmW) frequencies.

7. The communication system of claim 1, wherein the at least one portion of the one or more access points comprises adaptive antenna arrays configurable to communicate with the first reflective interface point.

8. The communication system of claim 1, wherein at least one of (i) a degree of (ii) a pattern of at least one of (i) a reflectivity or (ii) a scattering of the first reflective interface is selected to reduce a propagation of interfering signals.

9. The communication system of claim 1, wherein the at least one portion of the one or more access points is further configured to transfer the one or more transmissions to the second RF propagation environment based on at least one of:
   i) user-specific information associated with the one or more transmissions;
   ii) device-specific information associated with the one or more transmissions; or
   iii) location-specific information associated with the one or more transmissions.

10. The communication system of claim 1, wherein the first reflective interface point is configured to communicate with the second interface point based on at least one of:
    i) user-specific information associated with the one or more transmissions;
    ii) device-specific information associated with the one or more transmissions; or iii) location-specific information associated with the one or more transmissions.

11. An apparatus for communicating across a plurality of radio-frequency propagation environments, comprising:
a first antenna array located in a first propagation environment;
a second antenna array located in a second propagation environment;
a computer arrangement; and
a non-transitory, computer-readable medium comprising computer-executable instructions that, when executed by the computer arrangement, cause the apparatus to:
configure the first antenna array to receive expected signals transmitted by one or more devices or systems disposed in the first propagation environment and to reject interfering signals originating from the first propagation environment, and
transmit the received expected signals by reflecting a particular radio frequency to the second antenna array provided in the second propagation environment via a portal that is relatively permeable with respect to at least the particular radio frequency.

12. The apparatus of claim 11, wherein the computer-executable instructions, when executed by the computer arrangement, further cause the apparatus to selectively transmit the received expected signals using the particular radio frequency based on at least one of:
i) user-specific information associated with the received expected signals;
ii) device-specific information associated with the received expected signals; or
iii) location-specific information associated with the received expected signals.

13. The apparatus of claim 11, wherein the computer-executable instructions, when executed by the computer arrangement, further cause the apparatus to:
receive signals at the first antenna array using a particular further radio frequency from the second antenna array via the portal, wherein the portal is relatively permeable with respect to the particular further radio frequency; and
configure the first antenna array to transmit the received signals to the one or more devices or systems disposed in the first propagation environment.

14. The apparatus of claim 11, wherein the computer arrangement further causes the apparatus to configure the second antenna array to at least one of transmit signals to, or receive signals from, a further device or a system disposed in the second propagation environment, via the portal.

15. The apparatus of claim 11, wherein the computer-executable instructions, when executed by the computer arrangement, cause the apparatus to configure a spatial selectivity of at least one of the first antenna array or the second antenna array.

16. The apparatus of claim 11, wherein one of the first and second propagation environments comprises an indoor environment and another one of the first and second propagation environments comprises an outdoor environment.

17. The apparatus of claim 11, wherein the first and second propagation environments comprise indoor environments.

18. The apparatus of claim 11, wherein at least one of the first propagation environment or the second propagation environment comprises an in-vehicle environment.

19. The apparatus of claim 11, wherein the particular radio frequency comprises a millimeter-wave (mmW) frequency.

20. The communication system of claim 1, wherein the portal is part of a structure of a building.

21. The communication system of claim 1, wherein the first reflective interface point comprises:
a first set of circuitry configured to communicate with the second interface point; and
a second set of circuitry configured to communicate with the one or more access points, wherein the first set circuitry is different from the second set of circuitry.

22. The communication system of claim 21, wherein the first set of circuitry includes a first transmitter and a first receiver, and the second set of circuitry includes a second transmitter and a second receiver.

23. The communication system of claim 21, wherein the first set of circuitry is configured to communicate with the second interface point using a first set of frequencies, wherein and the second set of circuitry is configured to communicate with the one or more access points using a second set of frequencies.

24. The communication system of claim 23, wherein the first set of circuitry is configured to communicate with the second interface point using a first frequency from the first set of frequencies, wherein the second set of circuitry is configured to communicate with the one or more access points using a second frequency from the second set of frequencies, and wherein the second frequency is different from the first frequency.

25. The communication system of claim 1, wherein a location of the portal is based on properties of the wireless communication signal.

26. The apparatus of claim 11, wherein the portal is part of a structure of a building.

27. The apparatus of claim 11, wherein the first antenna array comprises:
a first set of circuitry configured to communicate with the second antenna array; and
a second set of circuitry configured to communicate with the one or more devices, wherein the first set of circuitry is different from the second set of circuitry.

28. The apparatus of claim 27, wherein the first set of circuitry includes a first transmitter and a first receiver, and wherein the second set of circuitry includes a second transmitter and a second receiver.

29. The apparatus of claim 27, wherein the first set of circuitry is configured to communicate with the second antenna array using a first set of frequencies, and wherein the second set of circuitry is configured to communicate with the one or more devices using a second set of frequencies.

30. The apparatus of claim 29, wherein the first set of circuitry is configured to communicate with the second antenna array using a first frequency from the first set of frequencies, wherein the second set of circuitry is configured to communicate with the one or more devices points using a second frequency from the second set of frequencies, and wherein the second frequency is different from the first frequency.

31. The apparatus of claim 11, wherein a location of the portal is based on the particular radio frequency.

* * * * *